US010282319B1

(12) United States Patent
Chang

(10) Patent No.: US 10,282,319 B1
(45) Date of Patent: May 7, 2019

(54) METHODS AND SYSTEMS FOR ARBITRATION OF PARALLEL MULTI-EVENT PROCESSING

(71) Applicant: X-Drive Technology, Inc., San Jose, CA (US)

(72) Inventor: Darder Chang, San Jose, CA (US)

(73) Assignee: X-Drive Technology, Inc., San Jose, CA (US)

( * ) Notice: Subject to any disclaimer, the term of this patent is extended or adjusted under 35 U.S.C. 154(b) by 0 days.

(21) Appl. No.: 15/878,901

(22) Filed: Jan. 24, 2018

(51) Int. Cl.
| G06F 9/54 | (2006.01) |
| G06F 13/16 | (2006.01) |
| G06F 13/18 | (2006.01) |
| G06F 13/40 | (2006.01) |
| G06F 13/364 | (2006.01) |

(52) U.S. Cl.
CPC .......... *G06F 13/1631* (2013.01); *G06F 9/542* (2013.01); *G06F 13/1642* (2013.01); *G06F 13/18* (2013.01); *G06F 13/364* (2013.01); *G06F 13/4036* (2013.01); *G06F 2213/36* (2013.01)

(58) Field of Classification Search
CPC .. G06F 13/1631; G06F 13/1642; G06F 13/18; G06F 9/542; G06F 2213/36
See application file for complete search history.

(56) References Cited

U.S. PATENT DOCUMENTS

| 6,857,035 | B1* | 2/2005 | Pritchard | G06F 13/374 |
| | | | | 700/3 |
| 7,809,861 | B1* | 10/2010 | Pritchard | G06F 13/4265 |
| | | | | 710/316 |
| 2005/0027920 | A1* | 2/2005 | Fitzsimmons | G06F 13/4022 |
| | | | | 710/317 |
| 2005/0091432 | A1* | 4/2005 | Adams | G06F 13/4022 |
| | | | | 710/100 |
| 2007/0255874 | A1* | 11/2007 | Jennings | G06F 13/1642 |
| | | | | 710/113 |

* cited by examiner

*Primary Examiner* — Glenn A. Auve
(74) *Attorney, Agent, or Firm* — Silicon Valley Patent Group LLP; Thomas Chan

(57) ABSTRACT

Method and system are disclosed for arbitration of parallel multi-event processing. In one embodiment, a parallel multi-event processing system includes a plurality of hardware components, where each hardware component in the plurality of hardware components is assigned with a unique range of addresses, a plurality of hardware engines, where the plurality of hardware engines are configured to access the plurality of hardware components, a controller configured to perform arbitration on one or more requested transactions among the plurality of hardware engines and the plurality of hardware components based on one or more hardware components in the plurality of hardware components to be accessed, and the plurality of hardware components, the plurality of hardware engines, and the controller are configured to perform the one or more requested transactions according to the arbitration.

22 Claims, 13 Drawing Sheets

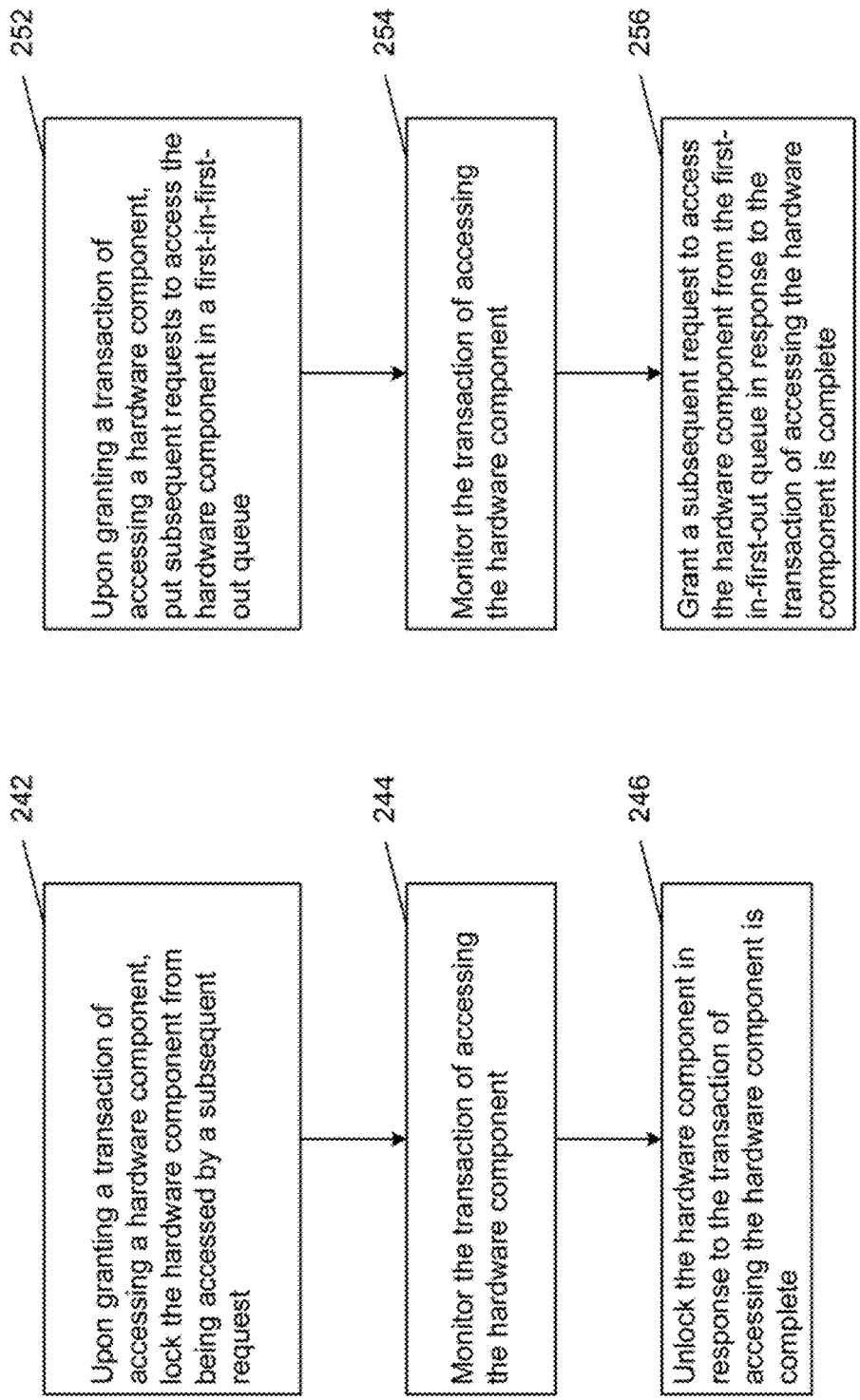

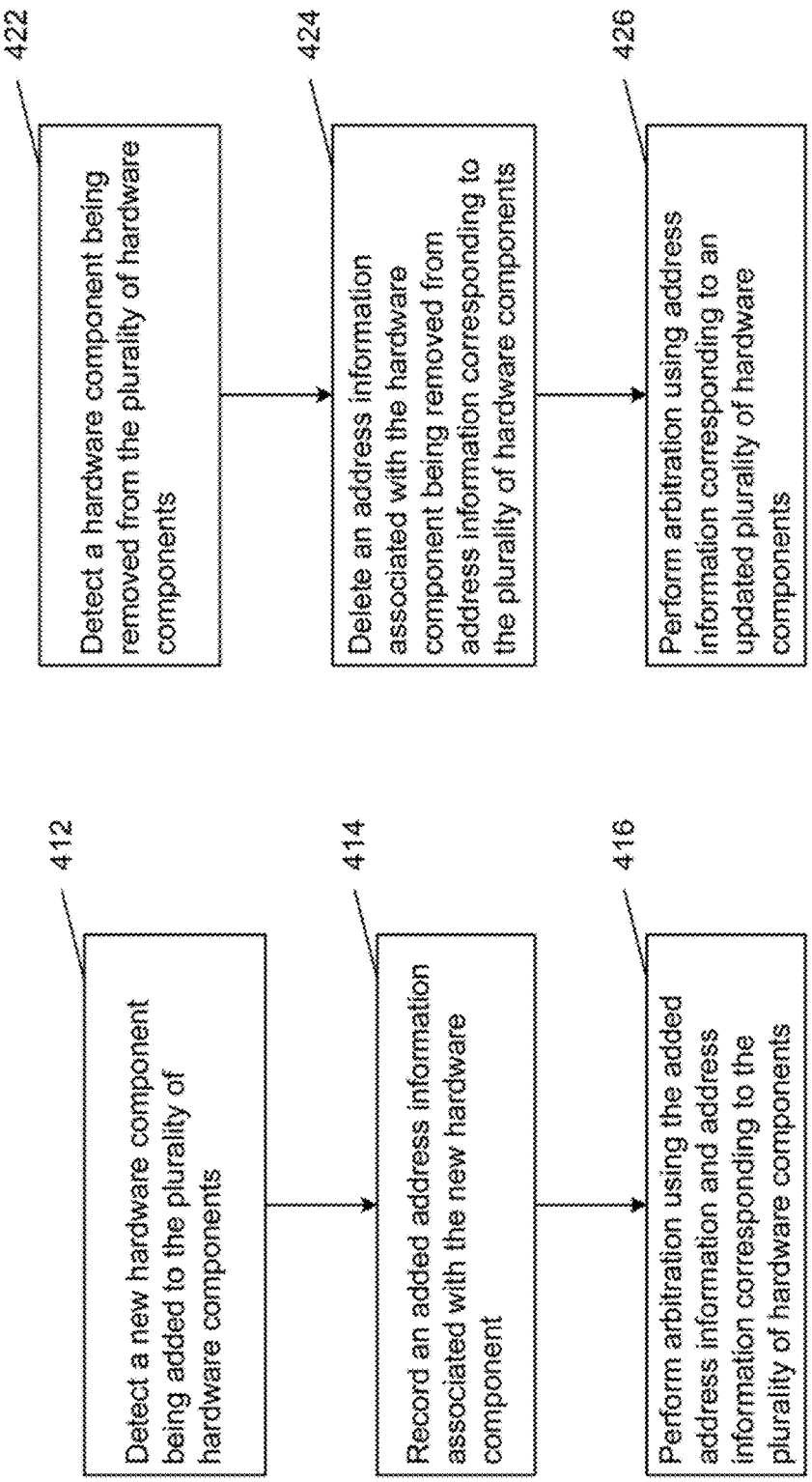

METHODS AND SYSTEMS FOR ARBITRATION OF PARALLEL MULTI-EVENT PROCESSING

FIELD OF THE INVENTION

The present invention relates to the field of data access in data center applications. In particular, the present invention relates to methods and systems for arbitration of parallel multi-event processing.

BACKGROUND

FIG. 1A illustrates a conventional system for arbitration of parallel multi-event processing. As shown in FIG. 1A, the conventional system includes a plurality hardware engines, a plurality of hardware components, and an associated arbitration logic associated with each of the plurality of hardware components. The plurality of hardware engines are represented by hardware engine A 102, hardware engine M 104, and hardware engine Y 106. The plurality of hardware components are represented by hardware component A 108 and hardware component Y 110. The arbitration logic A 108a is associated with the hardware component A 108. Similarly, the arbitration logic Y 110a is associated with the hardware component Y 110.

When one or more of the plurality of hardware engines need to access a hardware component in the plurality of hardware components, a request is made to the arbitration logic associated with the hardware component. For example, to access hardware component A 108, each of the hardware engine A 102, hardware engine M 104, and hardware engine Y 106 would make a request to the arbitration logic A 108a. Such requests are shown by the dotted arrow from each of the hardware engine A 102, hardware engine M 104 and hardware engine Y 106 to the arbitration logic A 108a. The arbitration logic A 108a may then arbitrate among the three requests based on various arbitration criteria and select one of the hardware engines to grant access, for example access is granted to hardware engine A 102, and putting the other two hardware engines, for example hardware engine M 104 and hardware engine Y 106, on hold. After the hardware engine A 102 has completed its access to hardware component A 108, the arbitration logic A 108a may then grant access to one of the other hardware components that are put on hold based on the arbitration criteria. In this system, in order to make an arbitration decision, each arbitration logic is required to have sufficient information about all the hardware engines that may access the hardware component associated with the arbitration logic. As the number of hardware engines increases, the complexity of this arbitration scheme also increases.

FIG. 1B illustrates modifications to the conventional system of FIG. 1A when a hardware engine is added. In FIG. 1B, the plurality of hardware components remain the same as in FIG. 1A. However, a new hardware engine, namely hardware engine Z 112, is added to this conventional system for arbitration of parallel multi-event processing. Due to this addition, the arbitration logic associated with each of the hardware component needs to be modified in order for them to work with the newly added hardware engine Z 112. As shown in FIG. 1B, the modified arbitration logic A' 108b would replace the arbitration logic A 108a in FIG. 1A. Similarly, the modified arbitration logic Y' 110b would replace the arbitration logic Y 110a in FIG. 1A. From this example, it is evident that it is burdensome to update each of the arbitration logic associated with each hardware component when a new engine is added. In a system where the number of hardware components are large, the burden of modifying their associated arbitration logic is further amplified.

FIG. 1C illustrates modifications to the conventional system of FIG. 1A when a hardware component is added. In FIG. 1C, the plurality of hardware engines remain the same as in FIG. 1A. However, a new hardware component, namely hardware component Z 114, is added to this conventional system for arbitration of parallel multi-event processing. To make this addition, the arbitration logic Z 114a associated with the hardware component Z 114 needs to be configured to work with all existing hardware engines, such as hardware engine A 102, hardware engine M 104, and hardware engine Y 106. This is illustrated with each of the arrow from hardware engine A 102, hardware engine M 104, and hardware engine Y 106 to the arbitration logic Z 114a, respectively. In a system where the number of hardware engines are large, the complexity of such arbitration scheme also increases accordingly.

Therefore, there is a need for methods and systems that address the issues of the conventional system in a parallel multi-event processing environment as described above. Specifically, there is a need for methods and systems for arbitration of parallel multi-event processing.

SUMMARY

Methods and systems are disclosed for arbitration of parallel multi-event processing. In one embodiment, a method of arbitration in a parallel multi-event processing system includes providing a plurality of hardware components, where each hardware component in the plurality of hardware components is assigned with a unique range of addresses, providing a plurality of hardware engines, where the plurality of hardware engines are configured to access the plurality of hardware components, performing arbitration, by a controller, on one or more requested transactions among the plurality of hardware engines and the plurality of hardware components based on one or more hardware components in the plurality of hardware components to be accessed, and performing the one or more requested transactions according to the arbitration.

In another embodiment, a parallel multi-event processing system includes a plurality of hardware components, where each hardware component in the plurality of hardware components is assigned with a unique range of addresses, a plurality of hardware engines, where the plurality of hardware engines are configured to access the plurality of hardware components, a controller configured to perform arbitration on one or more requested transactions among the plurality of hardware engines and the plurality of hardware components based on one or more hardware components in the plurality of hardware components to be accessed, and the plurality of hardware components, the plurality of hardware engines, and the controller are configured to perform the one or more requested transactions according to the arbitration.

According to aspects of the present disclosure, each hardware component in the plurality of hardware component comprises one or more subcomponents. Each subcomponent comprises at least one of: a set of registers, an array of memory locations; a hardware queue, a signal bus configured to communicate digital signals, or some combination thereof. Each hardware engine in the plurality of hardware engines comprises at least one of: a central processing unit, a digital signal processor, an application specific integrated circuit controller, a field programmable gate array controller, or some combination thereof.

According to aspects of the present disclosure, the controller is further configured to compare a first requested starting address to be accessed by a first hardware engine to a second requested starting address to be access by a second hardware engine, and grant accesses to the first hardware engine and the second hardware engine in response to the first requested starting address being different from the second requested starting address.

The controller is further configured to compare a first requested starting address to be accessed by a first hardware engine to a second requested starting address to be access by a second hardware engine, examine priority levels associated with the first hardware engine and the second hardware engine in response to the first requested starting address being the same as the second requested starting address, and grant access to the first hardware engine in response to the first hardware engine has a higher priority level than the second hardware engine, or vice versa.

Upon granting a transaction of accessing a hardware component, the controller is further configured to lock the hardware component from being accessed by a subsequent request, monitor the transaction of accessing the hardware component, and unlock the hardware component in response to the transaction of accessing the hardware component is complete.

Upon granting a transaction of accessing a hardware component, the controller is further configured to put subsequent requests to access the hardware component in a first-in-first-out queue, monitor the transaction of accessing the hardware component, and grant a subsequent request to access the hardware component from the first-in-first-out queue in response to the transaction of accessing the hardware component is complete.

The controller is further configured to detect a new hardware component being added to the plurality of hardware components, record an added address information associated with the new hardware component, and perform arbitration using the added address information and address information corresponding to the plurality of hardware components.

The controller is further configured to detect a hardware component being removed from the plurality of hardware components, delete an address information associated with the hardware component being removed from address information corresponding to the plurality of hardware components, and perform arbitration using address information corresponding to an updated plurality of hardware components.

The controller is further configured to detect a new hardware engine being added to the plurality of hardware engines, and perform arbitration on one or more requested transactions among the plurality of hardware engines and the plurality of hardware components without changing an arbitration scheme used prior to adding the new hardware engine.

The controller is further configured to detect a hardware engine being removed from the plurality of hardware engines, and perform arbitration on one or more requested transactions among the plurality of hardware engines and the plurality of hardware components without changing an arbitration scheme used prior to the hardware engine being removed from the plurality of hardware engines.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

FIG. 2E illustrates an exemplary method of avoiding potential conflict scenarios in arbitration of parallel multi-event processing according to aspects of the present disclosure.

FIG. 2F illustrates another exemplary method of avoiding potential conflict scenarios in arbitration of parallel multi-event processing according to aspects of the present disclosure.

FIG. 4B illustrates a method of adding a hardware engine in the system of FIG. 4A according to aspects of the present disclosure.

FIG. 4C illustrates a method of removing a hardware engine in the system of FIG. 4A according to aspects of the present disclosure.

DESCRIPTION OF EMBODIMENTS

Methods and systems are provided for arbitration of parallel multi-event processing. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 2A:
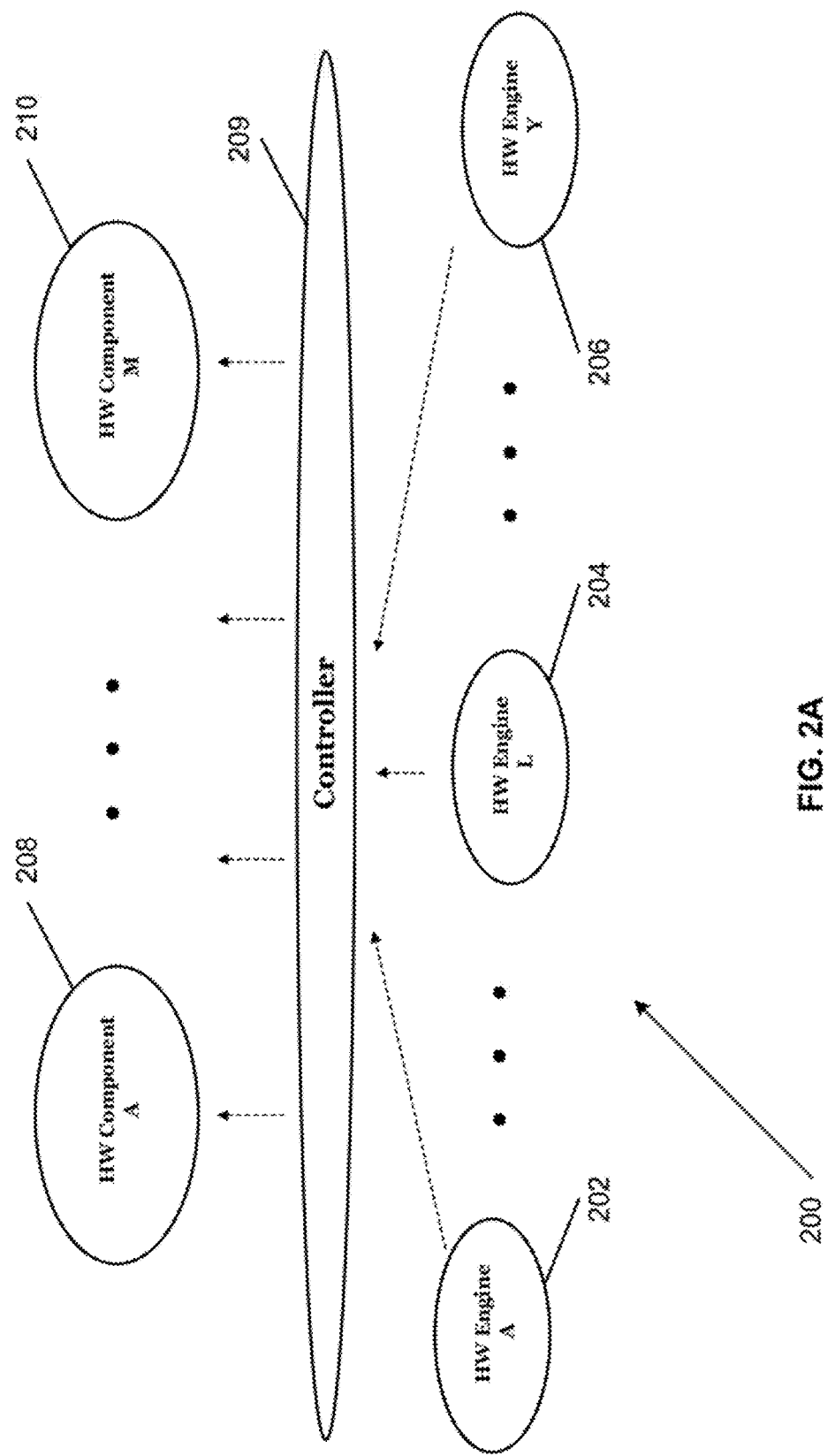
FIG. 2A illustrates an exemplary system for arbitration of parallel multi-event processing according to aspects of the present disclosure.

FIG. 2A illustrates an exemplary system for arbitration of parallel multi-event processing according to aspects of the present disclosure. In the example shown in FIG. 2A, the exemplary system 200 for arbitration of parallel multi-event processing includes a plurality of hardware engines, a plurality of hardware components, and a controller. The plurality of hardware engines are represented by hardware engine A 202, hardware engine L 204, and hardware engine Y 206. The plurality of hardware components are represented by hardware component A 208 and hardware component M 210. The controller 209 is configured to control and arbitrate accesses to the plurality of hardware components by the plurality of hardware engines.

In some implementations, each hardware component in the plurality of hardware component may include one or more subcomponents. Each subcomponent may further include at least one of: a set of registers, an array of memory locations; a hardware queue, a signal bus configured to communicate digital signals, or some combination thereof. Each hardware engine in the plurality of hardware engines may include at least one of: a central processing unit, a digital signal processor, an application specific integrated circuit controller, a field programmable gate array controller, or some combination thereof.

Figure 1A:
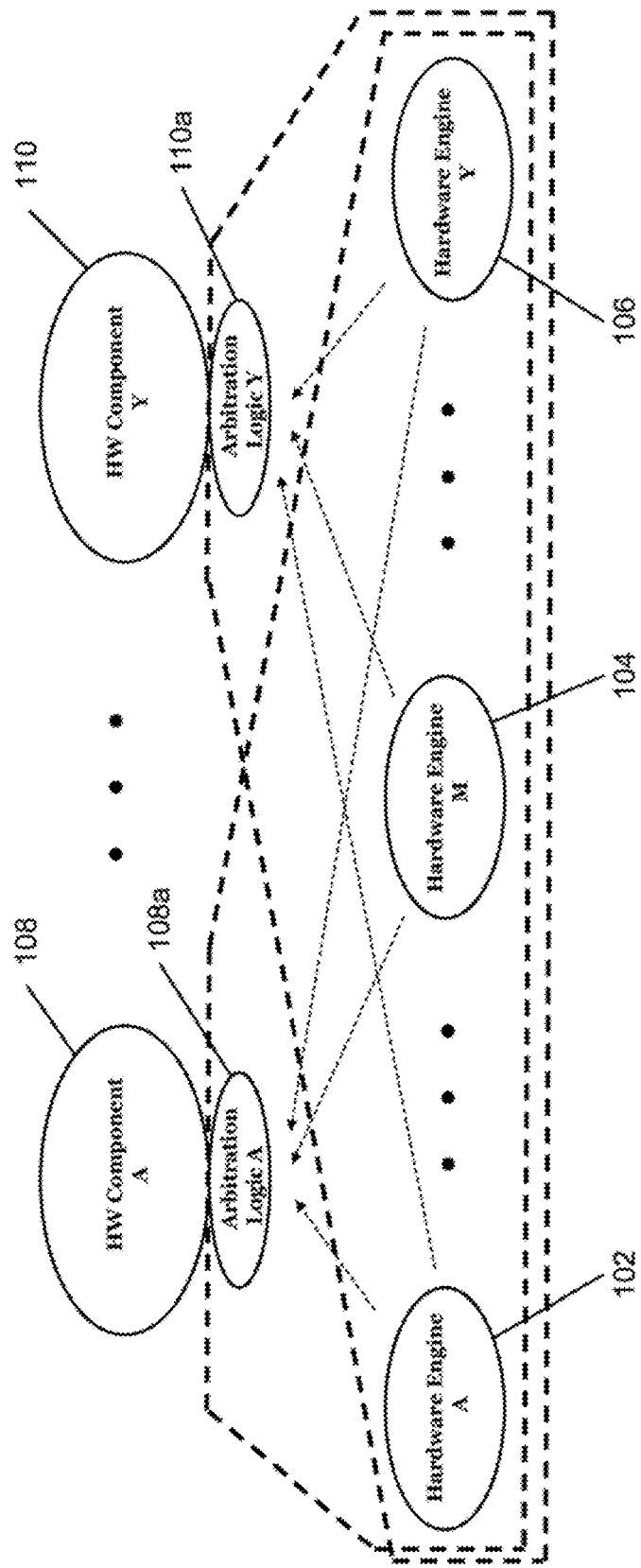
FIG. 1A illustrates a conventional system for arbitration of parallel multi-event processing.
Figure 1B:
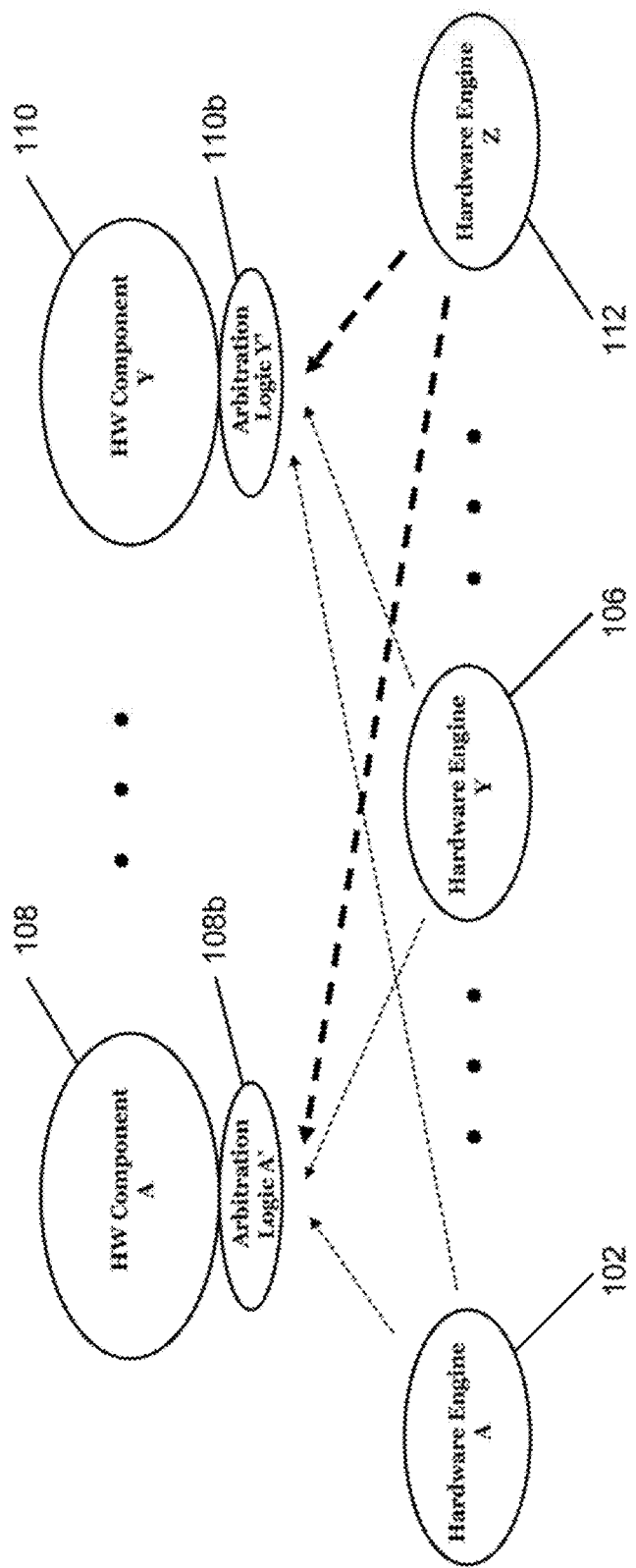
FIG. 1B illustrates modifications to the conventional system of FIG. 1A when a hardware engine is added.
Figure 1C:
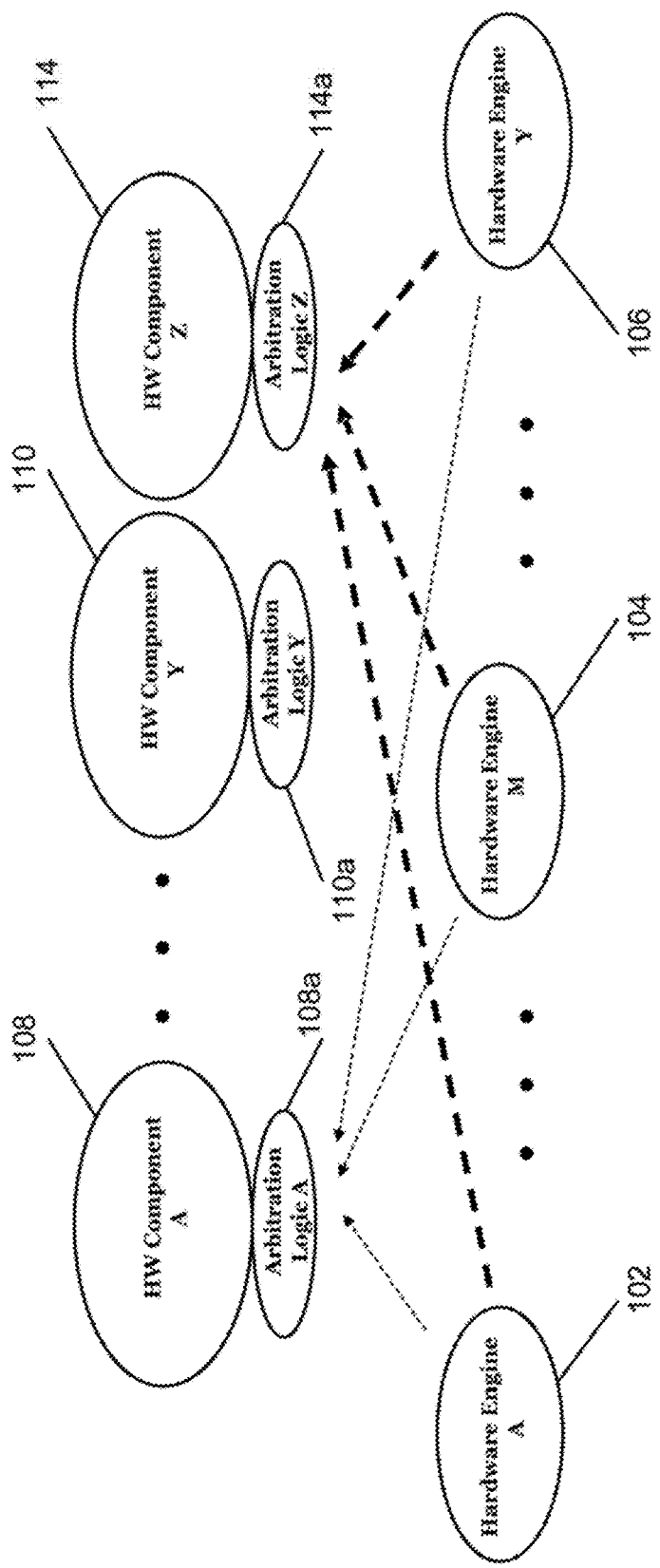
FIG. 1C illustrates modifications to the conventional system of FIG. 1A when a hardware component is added.

According to aspects of the present disclosure, the system 200 may have various advantages over the conventional system of FIG. 1A. For example, the arbitration in the system 200 can be based on the hardware components to be accessed as opposed to the conventional system that performs arbitration based on the identifications of the hardware engines that are used in the request for accessing the hardware components. In addition, the system 200 can reduce the overall wait time of the hardware engines by freeing up a hardware engine to perform other tasks, for example accessing other hardware components instead of being tied up waiting for a particular hardware component, in the event the particular hardware component is being accessed by another hardware engine. As a result, the overall efficiency of the system 200 is improved. The following sections further describe various aspects of the system 200 in detail.

Figure 2B:
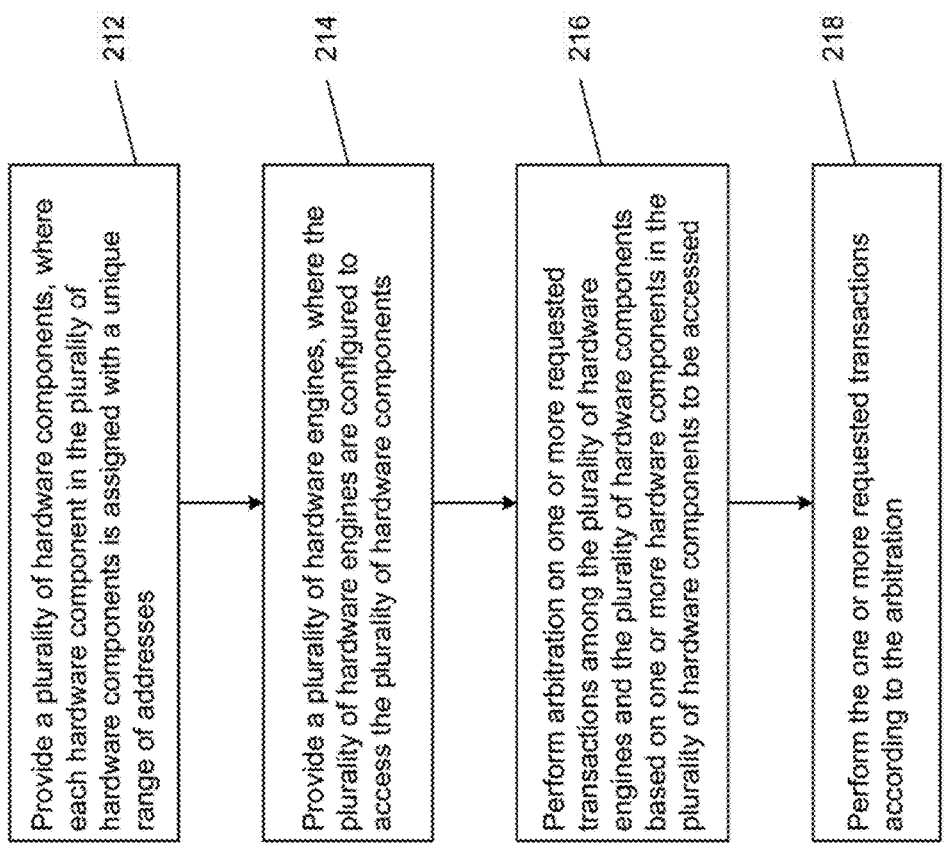
FIG. 2B illustrates an exemplary method of arbitration of parallel multi-event processing according to aspects of the present disclosure.

FIG. 2B illustrates an exemplary method of arbitration of parallel multi-event processing according to aspects of the present disclosure. As shown in FIG. 2B, in block 212, the method provides a plurality of hardware components, where each hardware component in the plurality of hardware components is assigned with a unique range of addresses. In block 214, the method provides a plurality of hardware engines, where the plurality of hardware engines are configured to access the plurality of hardware components. In block 216, the method performs arbitration, by a controller, on one or more requested transactions among the plurality of hardware engines and the plurality of hardware components based on one or more hardware components in the plurality of hardware components to be accessed. In block 218, the method performs the one or more requested transactions according to the arbitration.

According to aspects of the present disclosure, the interactions between firmware/software with hardware for performing arbitration on the one or more requested transactions among the plurality of hardware engines and the plurality of hardware components may include the following operations. The firmware writes starting address (or identification) register of the target shared hardware component. The hardware checks if the requested starting address is equal to the starting address locked by other hardware engines (also referred to as users). Then, hardware inserts wait-states if there is a conflict. Alternatively, the firmware may poll a lock status of the shared hardware component. Firmware accesses the target shared hardware component. Firmware then writes a release register to unlock the target shared hardware component for the next pending user to lock and access the target shared hardware component. Note that with this approach, the controller replaces all the arbitration logic associated with each of the hardware component. In this manner, a shared address space may be treated as a shared hardware component for arbitration.

Figures 2C, 2D:
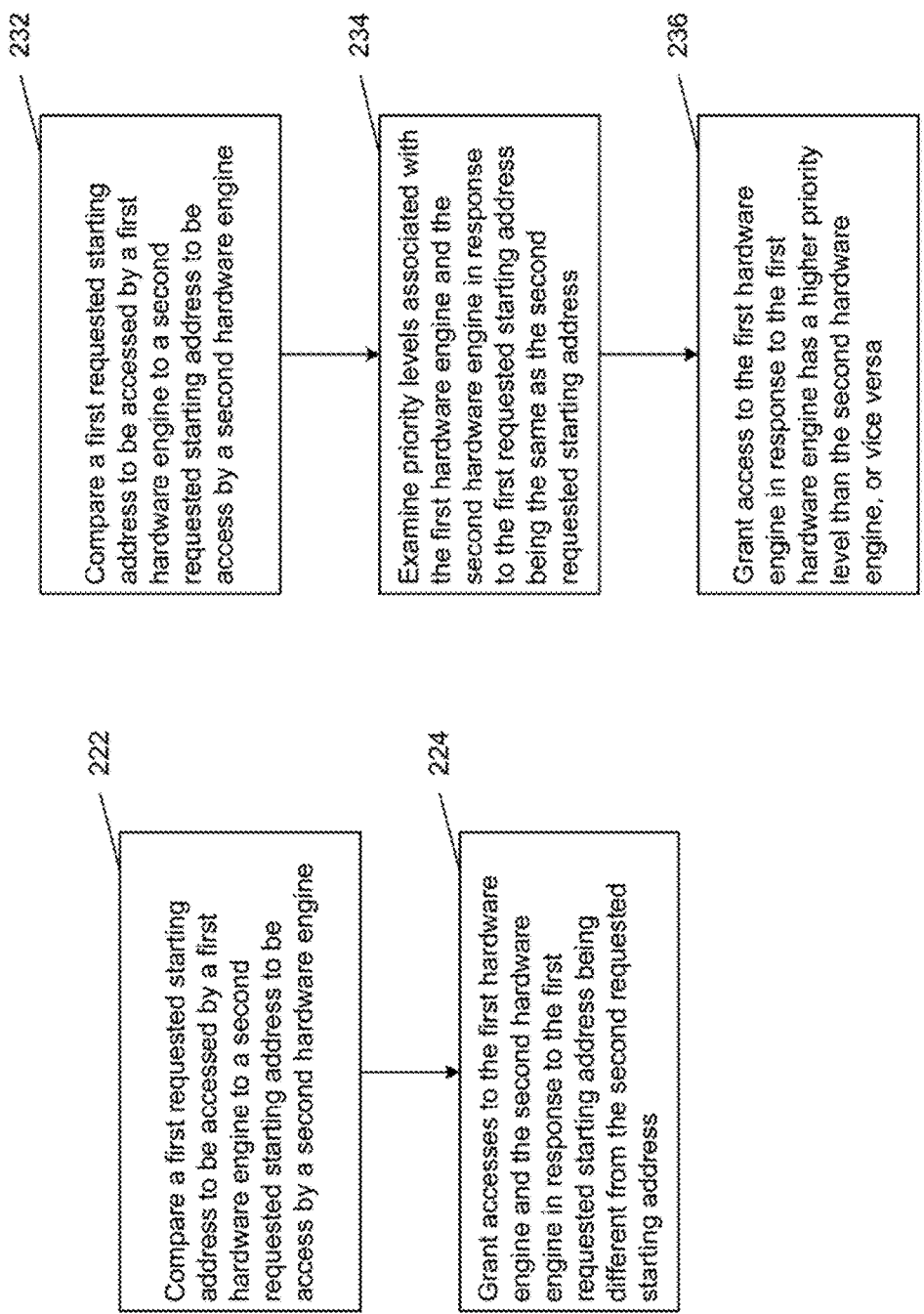
FIG. 2C illustrates an exemplary method for arbitration of parallel multi-event processing according to aspects of the present disclosure.
FIG. 2D illustrates another exemplary method for arbitration of parallel multi-event processing according to aspects of the present disclosure.

FIG. 2C illustrates an exemplary method for arbitration of parallel multi-event processing according to aspects of the present disclosure. In the exemplary implementation shown in FIG. 2C, in block 222, the method compares a first requested starting address to be accessed by a first hardware engine to a second requested starting address to be access by a second hardware engine. In block 224, the method grants accesses to the first hardware engine and the second hardware engine in response to the first requested starting address being different from the second requested starting address.

FIG. 2D illustrates another exemplary method for arbitration of parallel multi-event processing according to aspects of the present disclosure. In the exemplary implementation shown in FIG. 2D, in block 232, the method compares a first requested starting address to be accessed by a first hardware engine to a second requested starting address to be access by a second hardware engine. In block 234, the method examines priority levels associated with the first hardware engine and the second hardware engine in response to the first requested starting address being the same as the second requested starting address. In block 236, the method grants access to the first hardware engine in response to the first hardware engine has a higher priority level than the second hardware engine, or vice versa.

FIG. 2E illustrates an exemplary method of avoiding potential conflict scenarios in arbitration of parallel multi-event processing according to aspects of the present disclosure. In FIG. 2E, in block 242, upon granting a transaction of accessing a hardware component, the method locks the hardware component from being accessed by a subsequent request. In block 244, the method monitors the transaction of accessing the hardware component. In block 246, the method unlocks the hardware component in response to the transaction of accessing the hardware component is complete.

According to aspects of the present disclosure, a semaphore operation to access a shared hardware component may include the following operations: 1) request access to a shared hardware component by writing the starting address (or identification) of the shared hardware component; 2) wait for lock of the shared hardware component; 3) access the shared hardware component; and 4) release the lock of the shared hardware component. Note that for situations when there is a conflict, the wait for lock may be implemented by: 1) hardware may insert wait-states for situations when the wait period is short, 2) firmware may poll the lock status for situations when the wait period is short; or 3) an interrupt to trigger a thread of task may be used to service the event for situations when the wait period is long.

According to aspects of the present disclosure, locking and unlocking of a hardware component may be implemented through the use of arbitration control registers. The following table illustrates an example of such arbitration control registers.

|  | Arbitration (Request lock register) | Lock (Control/Status Register) |
|---|---|---|
| HW Engine A | Starting address (or ID) A | Unlock A |
| HW Engine B | Starting address (or ID) B | Unlock B |
| ... | ... | ... |
| HW Engine M | Starting address (or ID) M | Unlock M |
| ... | ... | ... |
| HW Engine Z | Starting address (or ID) Z | Unlock Z |

FIG. 2F illustrates another exemplary method of avoiding potential conflict scenarios in arbitration of parallel multi-event processing according to aspects of the present disclosure. In FIG. 2F, in block 252, upon granting a transaction of accessing a hardware component, the method puts subsequent requests to access the hardware component in a first-in-first-out queue. In block 254, the method monitors the transaction of accessing the hardware component. In block 256, the method grants a subsequent request to access the hardware component from the first-in-first-out queue in response to the transaction of accessing the hardware component is complete.

According to aspects of the present disclosure, locking and unlocking of a hardware component may be implemented through the use of a first-in-first-out queue or array. In one implementation, for hardware engines with 4-byte data bus, and every entry is independent from other entries, the controller may be configured to perform read-modify-write to entry (4N+1). Exemplary operations are as follows: 1) write starting address with (array starting address+(4N+1)) & 0xFFFFFFFC; 2) wait for lock (by hardware or firmware); 3) read (4N, 4N+1, 4N+2, 4N+3) together; 4) modify byte (4N+1); 5) write (4N, 4N+1, 4N+2, 4N+3) together; and 6) unlock hardware component. The following table illustrates an example of such arbitration control using array with I-byte entries with a hardware engine having a 4-byte data bus.

| 3 | 4 | 1 | 0 |
|---|---|---|---|
| 7 | 6 | 5 | 4 |
| ... | ... | ... | ... |
| 4N + 3 | 4N + 2 | 4N + 1 | 4N |
| ... | ... | ... | ... |
| 4Z + 3 | 4Z + 2 | 4Z + 1 | 4Z |

Figure 3A:
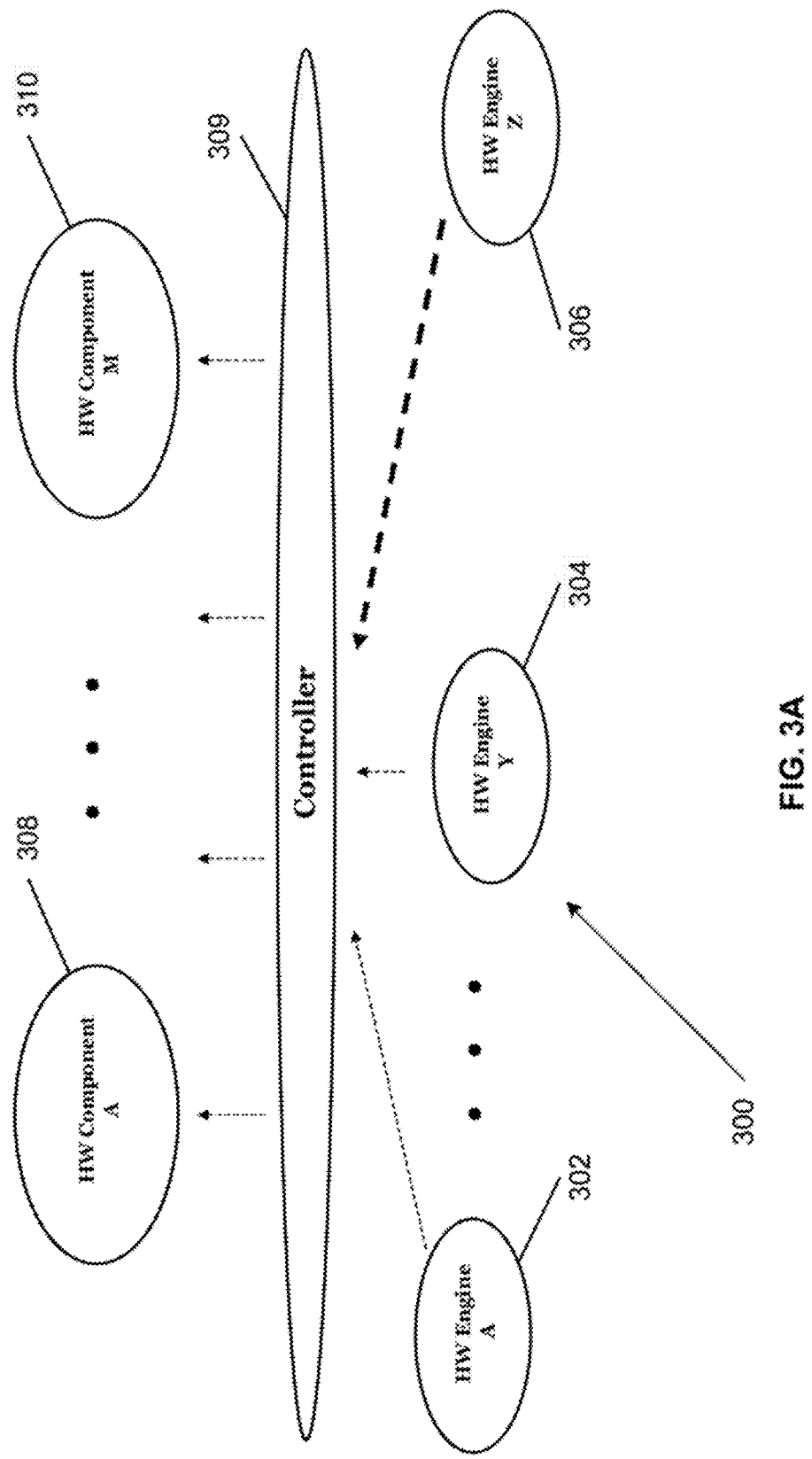
FIG. 3A illustrates modifications to the system of FIG. 2A when a hardware engine is added according to aspects of the present disclosure.

FIG. 3A illustrates modifications to the system of FIG. 2A when a hardware engine is added according to aspects of the present disclosure. As shown in the exemplary implementation of FIG. 3A, the plurality of hardware components remain the same as in FIG. 2A. However, a new hardware engine, namely hardware engine Z 306, is added to this system 300 for arbitration of parallel multi-event processing. The following paragraphs further describe exemplary implementations in handling adding or removing a hardware engine.

Figures 3B, 3C:
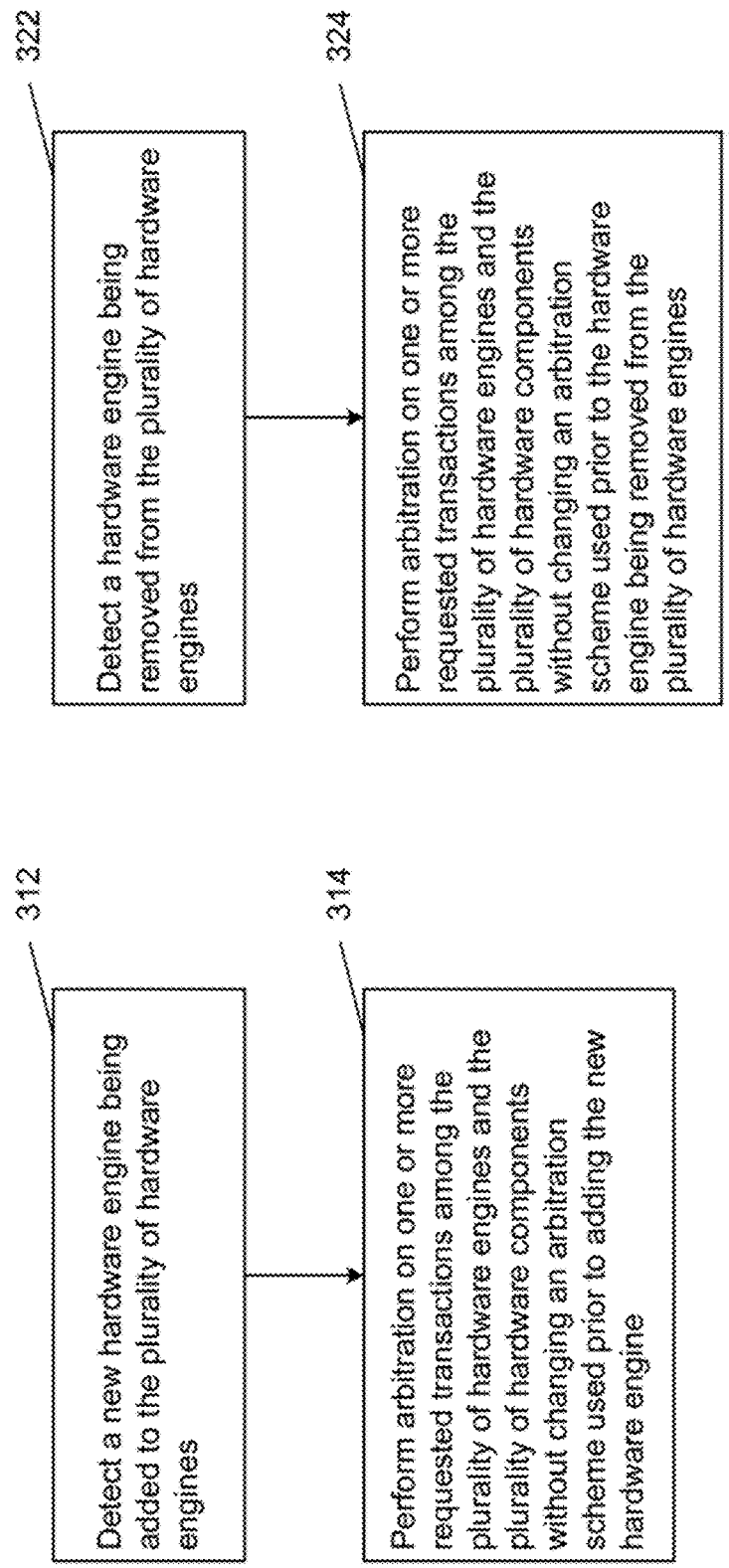
FIG. 3B illustrates a method of adding a hardware component in the system of FIG. 3A according to aspects of the present disclosure.
FIG. 3C illustrates a method of removing a hardware component in the system of FIG. 3A according to aspects of the present disclosure.

FIG. 3B illustrates a method of adding a hardware engine in the system of FIG. 3A according to aspects of the present disclosure. As shown in FIG. 3B, in block 312, the method detects a new hardware engine being added to the plurality of hardware engines. In block 314, the method performs arbitration on one or more requested transactions among the plurality of hardware engines and the plurality of hardware components without changing an arbitration scheme used prior to adding the new hardware engine.

FIG. 3C illustrates a method of removing a hardware engine in the system of FIG. 3A according to aspects of the present disclosure. As shown in FIG. 3C, in block 322, the method detects a hardware engine being removed from the plurality of hardware engines. In block 324, the method performs arbitration on one or more requested transactions among the plurality of hardware engines and the plurality of hardware components without changing an arbitration scheme used prior to the hardware engine being removed from the plurality of hardware engines.

Figure 4A:
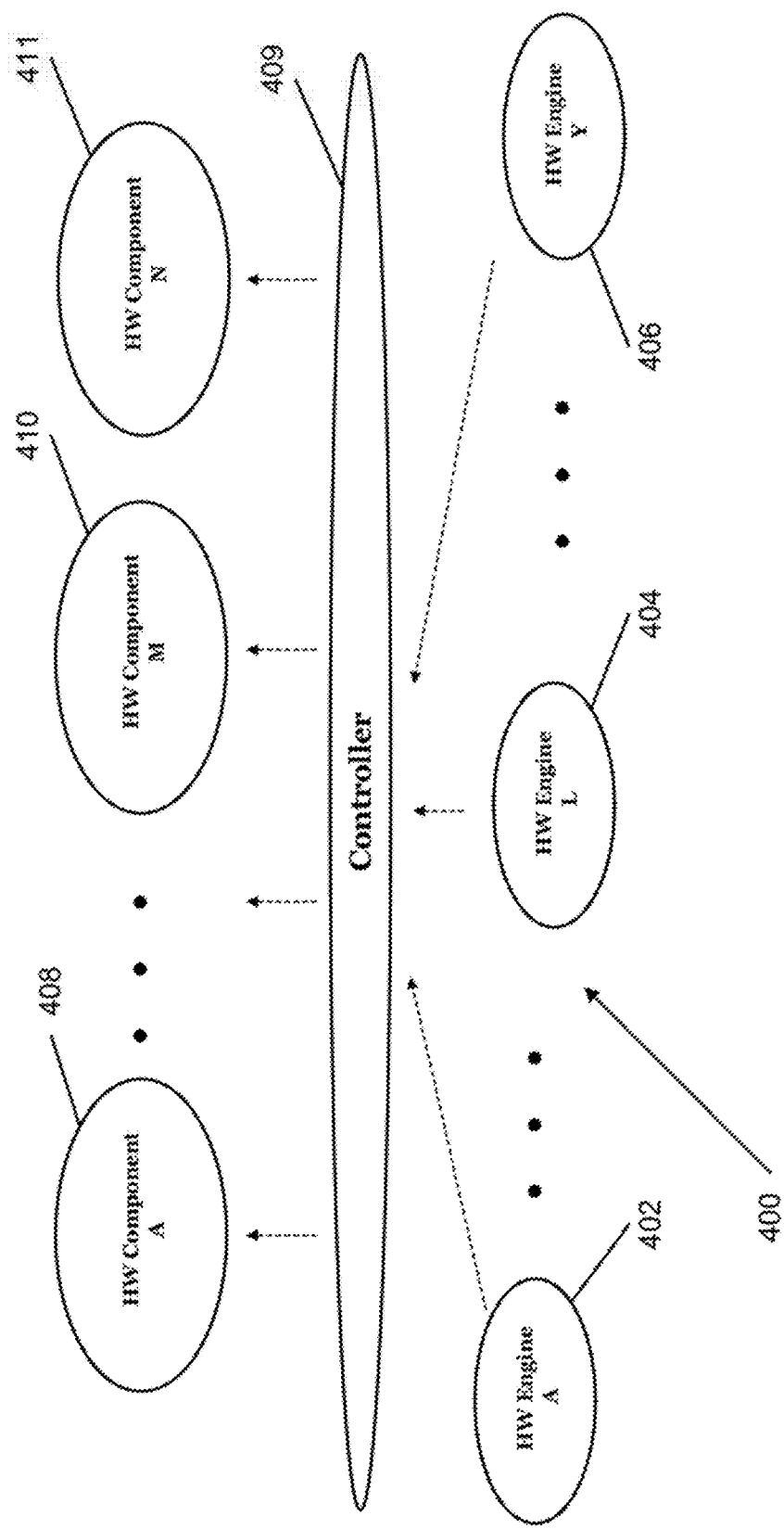
FIG. 4A illustrates modifications to the system of FIG. 2A when a hardware component is added according to aspects of the present disclosure.

FIG. 4A illustrates modifications to the system of FIG. 2A when a hardware component is added according to aspects of the present disclosure. In the exemplary implementation shown in FIG. 4A, the plurality of hardware engines remain the same as in FIG. 2A. However, a new hardware component, namely hardware component N 411, is added to this system 400 for arbitration of parallel multi-event processing. The following paragraphs further describe exemplary implementations in handling adding or removing a hardware component.

FIG. 4B illustrates a method of adding a hardware component in the system of FIG. 4A according to aspects of the present disclosure. As shown in FIG. 4B, in block 412, the method detects a new hardware component being added to the plurality of hardware components. In block 414, the method records an added address information associated with the new hardware component. In block 416, the method performs arbitration using the added address information and address information corresponding to the plurality of hardware components.

FIG. 4C illustrates a method of removing a hardware component in the system of FIG. 4A according to aspects of the present disclosure. As shown in FIG. 4C, in block 422, the method detects a hardware component being removed from the plurality of hardware components. In block 424, the method deletes an address information associated with the hardware component being removed from address information corresponding to the plurality of hardware components. In block 426, the method performs arbitration using address information corresponding to an updated plurality of hardware components.

Figure 5:
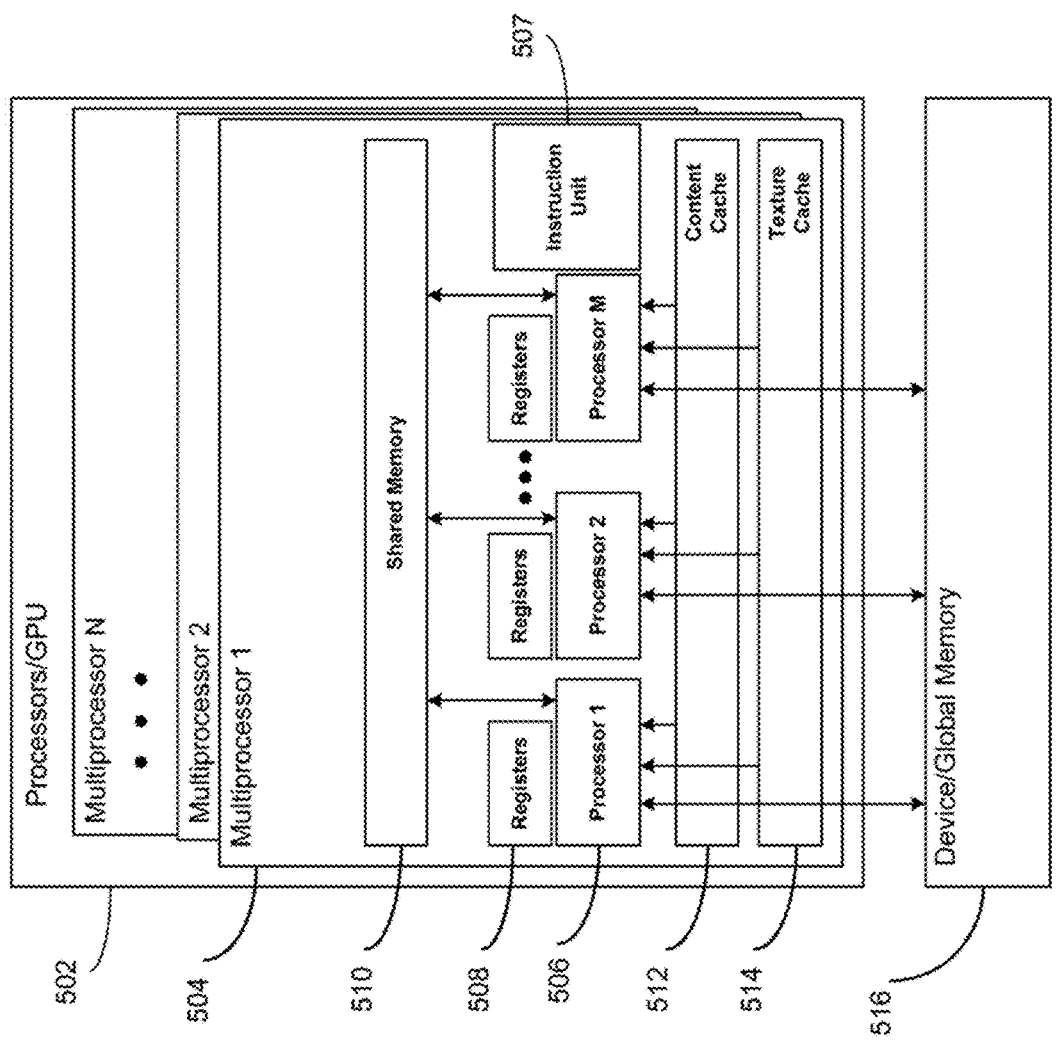
FIG. 5 illustrates an exemplary controller according to aspects of the present disclosure.

FIG. 5 illustrates an exemplary controller according to aspects of the present disclosure. As shown in FIG. 5, Processors/GPU 502 includes N multiprocessors. Each multiprocessor 504 further includes M processors 506 and an instruction unit 507. Each processor has its own registers 508. All the processors 506 in one multiprocessor 504 share a block of shared memory 510. All the processors share the same set of constant cache 512 and texture cache 514 memories. They can also access the data in device memory 516, which is also referred to as the global memory.

In this example, each multiprocessor 504 has a block of shared memory. Accessing data from the shared memory 510 is much faster than accessing data from the device (global) memory 516. For this reason, one approach to increase computational efficiency is to load the data from the global memory 516 to the shared memory 510, perform much of the computations/manipulations using the shared memory 510, and then write back the results from the shared memory 510 to the global memory 516.

Processors/GPU 502 may include a plurality of multiprocessors, such as multiprocessor 1 through multiprocessor N. In this example, each of processor may be configured to execute tasks. The tasks may be of different types, and, in some examples, each respective type of task may be stored in or associated with a respective task queue while waiting for execution by a processor. The different types of tasks may include, for example, front end tasks, which may include receiving and interpreting instructions received from host device 4. Other types of tasks including caching; back-end tasks, which may include reading data from or writing data to NVM 10; housing-keeping, which may include garbage collection, wear leveling, TRIM, or the like; and system tasks. In some examples, each processor may be referred to as a compute unit, a processing unit, a core, or a central processing unit (CPU).

In accordance with examples of this disclosure, a first processor 506 may be configured to operate as a scheduler that schedules tasks for execution by at least one other processor. First processor 506 may assign tasks from a plurality of task queues to at least one other processor. As described above, each of the task queues may be associated with a task type.

In contrast to some other scheduling techniques, each task queue is associated with a respective priority ratio, and the priority ratio defines the frequency with which tasks from the respective task queue are scheduled by first processor 506 to be executed by the at least one processor. The respective priority ratio for each task queue may be based at least in part on the number of tasks in the respective task queue. In this way, the respective priority ratios are reflective of a number of tasks in the respective task queues, and the frequency with which tasks from a task queue are assigned by first processor 506 for execution is based at least in part on the number of tasks in the task queue.

In some examples, the respective priority ratios may be updated from time to time, such that the respective priority ratios are reflective of a current or recent number of tasks in the respective task queues. In this way, the techniques described herein may facilitate auto prioritization of the respective task queues based at least in part on the number of tasks currently or recently in the task queue.

For example, first processor 506 may determine the respective priority ratio associated with each task queue based at least in part on a number of tasks in the respective task queue. In some examples, first processor 506 additionally may base the priority ratio on a type of task associated with the respective task queue. For example, front-end tasks may have a higher priority than house-keeping tasks or system tasks. The priority ratio may define a relative frequency with which first processor 506 assigns task from the respective task queues to the at least one other processor. First processor 506 may update the respective priority ratio from time to time to adjust for the number of tasks in the respective task queue.

In some examples, first processor 506 may assign tasks from the respective task queues to the at least one other processor by progressing through tasks associated with the respective task queues in a predetermined order in which the task queues are interleaved. First processor 506 may determine whether to send a task from a respective task queue to be executed by at least one other processor based on the priority ratio of the respective task queue, which may be a ratio of execute indicators to skip indicators. In this way, when the priority ratio associated with a respective task queue is higher, first processor 506 assigns tasks from the respective task queue to the at least one other processor more often than when the priority ratio associated with the respective task queue is lower. Further, assuming the priority ratio is greater than zero, first processor 506 continues to assign tasks from each respective task queue to the at least one other processor.

Figure 6:
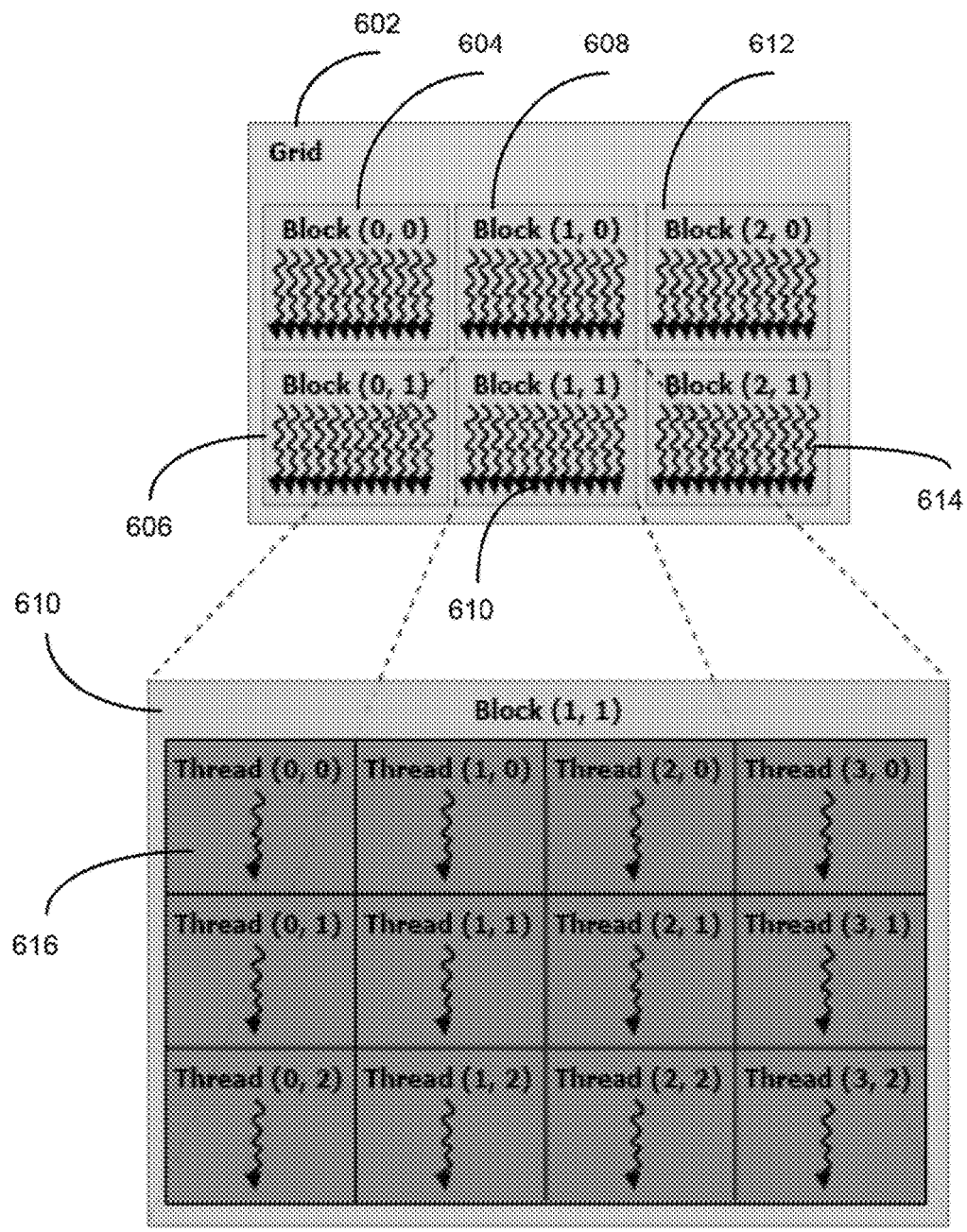
FIG. 6 illustrates an exemplary arrangement of threads in a controller according to aspects of the present disclosure.

FIG. 6 illustrates an exemplary arrangement of threads in a controller according to aspects of the present disclosure. In this example, threads are arranged in a grid 602, and they are divided into blocks of threads, for example block (0, 0) 604, block (0, 1) 606, block (1, 0) 608, block (1, 1) 610, block (2, 0) 612, and block (2, 2) 614. Each block of threads (for example block (1,1) 610, is assigned to one multiprocessor and threads within one block, for example thread (0,0) 616, can communicate with each other using the shared memory as described in association with FIG. 5.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, and firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A method of arbitration in a parallel multi-event processing system, comprising:
    providing a plurality of hardware components, wherein each hardware component in the plurality of hardware components is assigned with a unique range of addresses;
    providing a plurality of hardware engines, wherein the plurality of hardware engines are configured to access the plurality of hardware components;
    performing arbitration, by a controller, on one or more requested transactions among the plurality of hardware engines and the plurality of hardware components based on one or more hardware components in the plurality of hardware components to be accessed, comprising comparing a first requested starting address to be accessed by a first hardware engine to a second requested starting address to be access by a second hardware engine, and granting accesses to the first hardware engine and the second hardware engine in response to the first requested starting address being different from the second requested starting address; and
    performing the one or more requested transactions according to the arbitration.

2. The method of claim 1,
    wherein each hardware component in the plurality of hardware component comprises one or more subcomponents.

3. The method of claim 2,
    wherein each subcomponent comprises at least one of: a set of registers, an array of memory locations; a hardware queue, a signal bus configured to communicate digital signals, or some combination thereof.

4. The method of claim 1,
    wherein each hardware engine in the plurality of hardware engines comprises at least one of: a central processing unit, a digital signal processor, an application specific integrated circuit controller, a field programmable gate array controller, or some combination thereof.

5. The method of claim 1, wherein performing arbitration further comprises:
    comparing a first requested starting address to be accessed by a first hardware engine to a second requested starting address to be access by a second hardware engine;
    examining priority levels associated with the first hardware engine and the second hardware engine in response to the first requested starting address being the same as the second requested starting address; and
    granting access to the first hardware engine in response to the first hardware engine has a higher priority level than the second hardware engine, or granting access to the second hardware engine in response to the second hardware engine has a higher priority level than the first hardware engine.

6. The method of claim 5, wherein performing arbitration further comprises:
    upon granting a transaction of accessing a hardware component,
    locking the hardware component from being accessed by a subsequent request;
    monitoring the transaction of accessing the hardware component; and
    unlocking the hardware component in response to the transaction of accessing the hardware component is complete.

7. The method of claim 5, wherein performing arbitration further comprises:
upon granting a transaction of accessing a hardware component,
putting subsequent requests to access the hardware component in a first-in-first-out queue;
monitoring the transaction of accessing the hardware component; and
granting a subsequent request to access the hardware component from the first-in-first-out queue in response to the transaction of accessing the hardware component is complete.

8. The method of claim 1, further comprising:
detecting a new hardware component being added to the plurality of hardware components;
recording an added address information associated with the new hardware component; and
performing arbitration using the added address information and address information corresponding to the plurality of hardware components.

9. The method of claim 1, further comprising:
detecting a hardware component being removed from the plurality of hardware components;
deleting an address information associated with the hardware component being removed from address information corresponding to the plurality of hardware components; and
performing arbitration using address information corresponding to an updated plurality of hardware components.

10. The method of claim 1, further comprising:
detecting a new hardware engine being added to the plurality of hardware engines; and
performing arbitration on one or more requested transactions among the plurality of hardware engines and the plurality of hardware components without changing an arbitration scheme used prior to adding the new hardware engine.

11. The method of claim 1, further comprising:
detecting a hardware engine being removed from the plurality of hardware engines; and
performing arbitration on one or more requested transactions among the plurality of hardware engines and the plurality of hardware components without changing an arbitration scheme used prior to the hardware engine being removed from the plurality of hardware engines.

12. A parallel multi-event processing system, comprising:
a plurality of hardware components, wherein each hardware component in the plurality of hardware components is assigned with a unique range of addresses;
a plurality of hardware engines, wherein the plurality of hardware engines are configured to access the plurality of hardware components; and
a controller configured to perform arbitration on one or more requested transactions among the plurality of hardware engines and the plurality of hardware components based on one or more hardware components in the plurality of hardware components to be accessed, comprising compare a first requested starting address to be accessed by a first hardware engine to a second requested starting address to be access by a second hardware engine, and grant accesses to the first hardware engine and the second hardware engine in response to the first requested starting address being different from the second requested starting address;
wherein the plurality of hardware components, the plurality of hardware engines, and the controller are configured to perform the one or more requested transactions according to the arbitration.

13. The system of claim 12,
wherein each hardware component in the plurality of hardware component comprises one or more subcomponents.

14. The system of claim 12,
wherein each subcomponent comprises at least one of: a set of registers, an array of memory locations; a hardware queue, a signal bus configured to communicate digital signals, or some combination thereof.

15. The system of claim 12,
wherein each hardware engine in the plurality of hardware engines comprises at least one of: a central processing unit, a digital signal processor, an application specific integrated circuit controller, a field programmable gate array controller, or some combination thereof.

16. The system of claim 12, wherein the controller is further configured to:
compare a first requested starting address to be accessed by a first hardware engine to a second requested starting address to be access by a second hardware engine;
examine priority levels associated with the first hardware engine and the second hardware engine in response to the first requested starting address being the same as the second requested starting address; and
grant access to the first hardware engine in response to the first hardware engine has a higher priority level than the second hardware engine, or grant access to the second hardware engine in response to the second hardware engine has a higher priority level than the first hardware engine.

17. The system of claim 16, wherein the controller is further configured to:
upon granting a transaction of accessing a hardware component,
lock the hardware component from being accessed by a subsequent request;
monitor the transaction of accessing the hardware component; and
unlock the hardware component in response to the transaction of accessing the hardware component is complete.

18. The system of claim 16, wherein the controller is further configured to:
upon granting a transaction of accessing a hardware component,
put subsequent requests to access the hardware component in a first-in-first-out queue;
monitor the transaction of accessing the hardware component; and
grant a subsequent request to access the hardware component from the first-in-first-out queue in response to the transaction of accessing the hardware component is complete.

19. The system of claim 12, wherein the controller is further configured to:
detect a new hardware component being added to the plurality of hardware components;
record an added address information associated with the new hardware component; and
perform arbitration using the added address information and address information corresponding to the plurality of hardware components.

20. The system of claim 12, wherein the controller is further configured to:

detect a hardware component being removed from the plurality of hardware components;

delete an address information associated with the hardware component being removed from address information corresponding to the plurality of hardware components; and perform arbitration using address information corresponding to an updated plurality of hardware components.

21. The system of claim 12, wherein the controller is further configured to:

detect a new hardware engine being added to the plurality of hardware engines; and perform arbitration on one or more requested transactions among the plurality of hardware engines and the plurality of hardware components without changing an arbitration scheme used prior to adding the new hardware engine.

22. The system of claim 12, wherein the controller is further configured to:

detect a hardware engine being removed from the plurality of hardware engines; and perform arbitration on one or more requested transactions among the plurality of hardware engines and the plurality of hardware components without changing an arbitration scheme used prior to the hardware engine being removed from the plurality of hardware engines.

* * * * *